July 17, 1962     C. W. BARNUM     3,044,277
MEANS FOR MAKING FRUIT FLAVORED SLUSHY FOOD DRINK
Filed Jan. 20, 1958     3 Sheets-Sheet 1

INVENTOR.
C.W. BARNUM
BY
John H. Widdowson
ATTORNEY

July 17, 1962   C. W. BARNUM   3,044,277
MEANS FOR MAKING FRUIT FLAVORED SLUSHY FOOD DRINK
Filed Jan. 20, 1958   3 Sheets-Sheet 3

INVENTOR.
C.W. BARNUM

BY
*John W. Wilkinson*
ATTORNEY

United States Patent Office 3,044,277
Patented July 17, 1962

3,044,277
MEANS FOR MAKING FRUIT FLAVORED
SLUSHY FOOD DRINK
Caleb W. Barnum, Wichita, Kans., assignor to
Lyman D. Dunn
Filed Jan. 20, 1958, Ser. No. 710,129
6 Claims. (Cl. 62—342)

This invention relates to the food service industry. In a more specific aspect this invention relates to apparatus for making a food and/or drink desirably merchandized through the food service industry. In a still more specific aspect this invention relates to apparatus for making a slushy food drink from fruit flavored water which has been sweetened to appeal to the consumer. And yet in a more specific aspect this invention relates to apparatus wherein a continuous supply for sale of a slushy fruit flavored and sweetened food drink is automatically supplied for withdrawal for service to consumers and customers in food service business establishments.

A great variety of foods, drinks, and/or food drinks have long been known and served by businesses in the food service industry. There are many different kinds and classes of food service industry establishments, including restaurants wherein the patrons are waited upon by waiters and/or waitresses, cafeteria type establishments wherein the consumers and purchasers serve themselves to a great extent, drive-in restaurants wherein customers are served by waitresses and/or waiters while seated in their automobile, and so-called dairy stores which normally serve or deliver their food and drink products to the customer through relatively small windows or other outlets in the business establishments, the consumer or customer then taking the food and/or drink wherever he might choose to consume same. This so-called dairy store type food service establishment is very popular throughout the world and particularly in the U.S.A., and it is in this type of establishment that the new slushy food drink making apparatus of my invention is particularly desirable. However, any type of food service establishment can find ready use for the new apparatus and machine of my invention to prepare and serve a fruit flavored slushy food drink, and the machine has ready application for producing the drink for sale at such as baseball parks, or football stadiums, circuses, fairs, and the like. Slushy, fruit flavored, food drinks made from fruit flavoring, either natural and/or synthetic, and sweetened water are known in the food service industry. These slushy food drinks are commonly flavored lemon, lime, orange, grape, and other suitable flavors, and they are prepared by partially freezing the water, flavor and sugar mixture to provide a slush condition. Agitation by mixer type means has been used during the partial freezing to produce the slush, and the resulting slushy mixture is commonly stored in a deep freeze to maintain same. A ladle has been commonly used to dip up the slush into a cup in which it is served and sold. In this method and means it is almost impossible to keep the slush in a desirable condition, hardening to an unworkable mass occuring around the walls of the container to the extent that any lull in sales and use results in substantially ruining the slush mixture unless the operator takes time out to frequently agitate and stir up the slush by hand. Further, such an operation has been found to be quite unsanitary, with a great probability that foreign substances will fall into the slush container in the deep freeze due to constantly removing the top thereof to get at the slush with the ladle. The new slush making machine and apparatus of any invention overcomes all of the difficulties and hazards of the common methods and means to prepare and handle the slush drinks. My apparatus prepares and maintains the slush drink in perfect desired condition, even though there is a lull in use and sales of the resulting slush. My apparatus provides for a complete sanitary condition, with no possibility of contamination by undesirable foreign substances from the room or building wherein the machine is used, or from employees withdrawing and serving the slush from the machine. The new automatic and continuous slush making machine of my invention is indeed a great step forward in the art, and overcomes all the difficulties now being experienced with slush drinks in the food service industry.

As has been pointed out hereinbefore the new invention of mine is a machine for making a fruit food drink. The fruit flavors and syrups from which the slush drinks are made are known in the food service industry, and can be purchased through any of several sources. The syrup products of some companies can be used merely by adding same to the desired and preferred amount of water for a given amount of the fruit flavored sweetened syrup. Or one can make the syrup from available fruit flavoring, water and sugar.

The new apparatus of my invention for making fruit flavored water into a slush utilizes a tank. Means are mounted and operable relative to the tank to remove heat which is passed through the walls of the tank. It is preferred that these means be mechanical refrigeration means, and such can conveniently be incorporated into the whole assembly embodying my new slush making apparatus. The tank has paddle or dasher means rotatable therein, preferably removably so, and the paddle or dasher means are adapted to turn in operation during the making of the slush and maintaining resulting slush for subsequent dispensing. The new apparatus of my invention has means to turn the paddle or dasher means. Means are provided to introduce the fruit flavored water into the tank, and I prefer that these means be continuous feed means as discussed hereinafter. The new apparatus of my invention for making fruit flavored water into a slush is constructed and operable to receive a fruit flavored water in the tank, freeze a portion of this water in the tank to provide a slush condition, and to allow for removal of the resulting slush formed in the tank for selling and service to customers of the food service industry establishments using the apparatus or machine.

It is an object of this invention to provide new means for the food service industry.

It is another object of this invention to provide apparatus for the food service industry to prepare slushy drinks and/or foods.

Yet another object of this invention is to provide new apparatus for making fruit flavored and sweetened water into a slush food drink, such apparatus being employed in the food service industry, particularly in those food service businesses or establishments commonly called dairy stores.

Still another object of this invention is to provide new and more convenient means for preparing and dispensing fruit flavored slush drinks, such apparatus being easy to use and reliable in use, and providing sanitary making and dispensing conditions.

Other objects and advantages of the new apparatus of my invention for making fruit flavored water into slush and dispensing same will be apparent to those skilled in the art upon reading this enclosure.

Drawings accompany and are a part of this disclosure. These drawings depict preferred specific embodiments of the new apparatus of my invention for making fruit flavored water into a slush, and it is to be understood that such drawings are not to unduly limit the scope of my invention.

Figure 1:
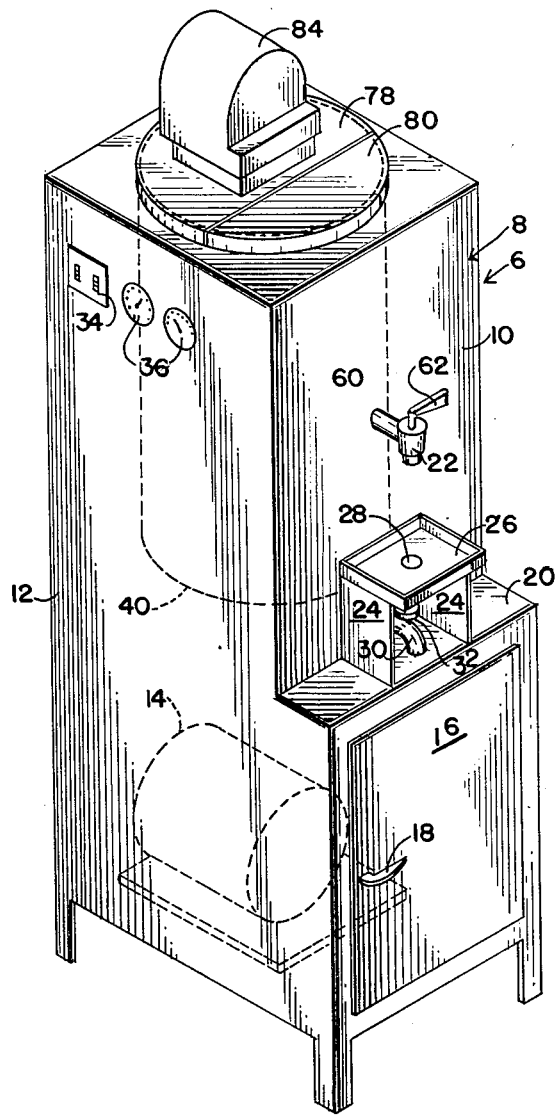
FIG. 1 is a perspective view of a preferred specific embodiment of the new apparatus of my invention for producing and dispensing a slushy drink from fruit flavored water.

In the following is a discussion and description of the new apparatus of my invention for making fruit flavored water into a slush, and reference is made to the drawings whereon the same reference numeral are used to indicate the same or similar parts or structure. The discussion and description is of preferred specific embodiments of the new apparatus of my invention, and it is to be understood that such is not to unduly limit the scope of my invention.

Figure 2:
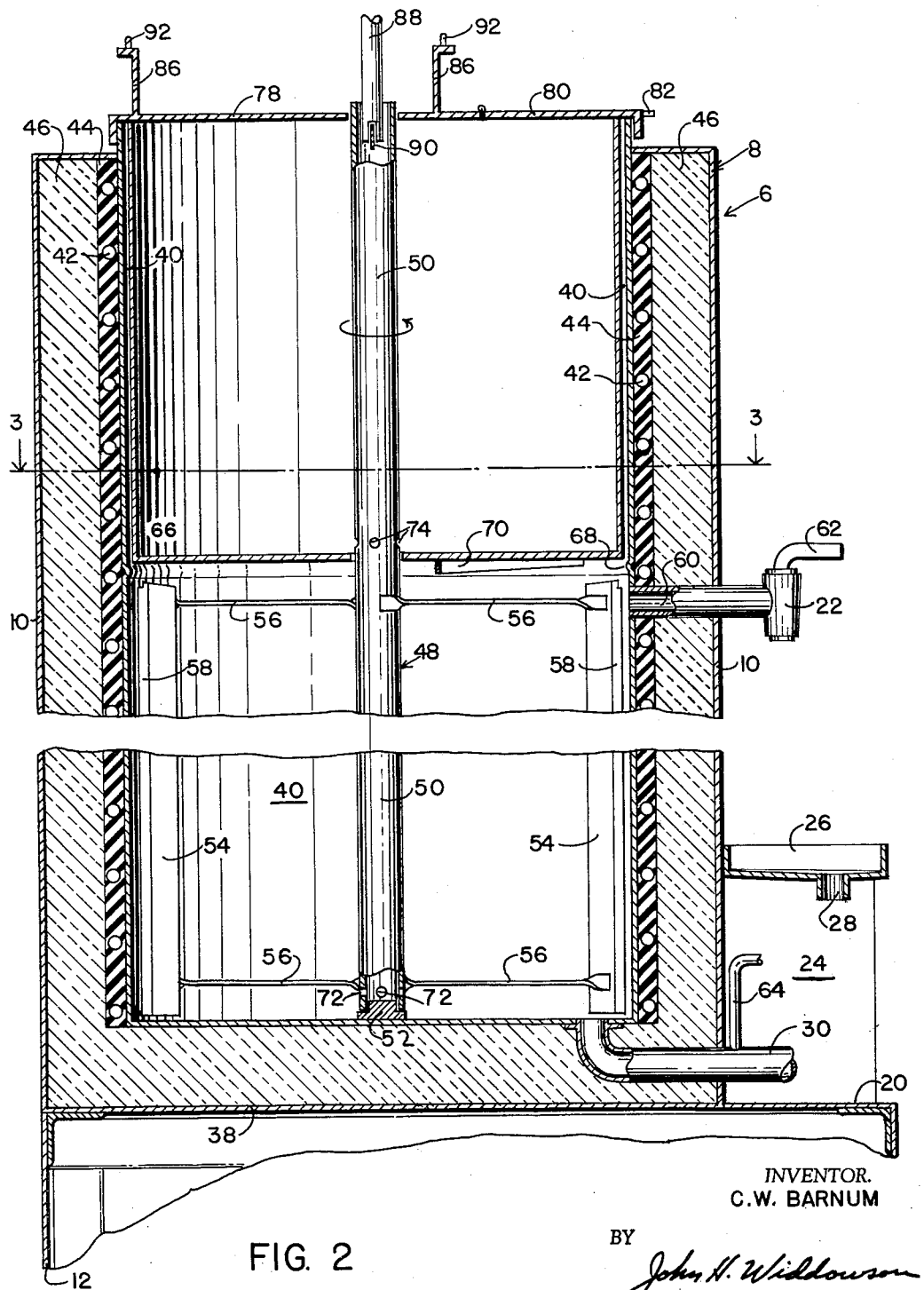
FIG. 2 is an enlarged longitudinal elevation view in cross-section and partially cut away of the apparatus shown in FIG. 1.
Figure 3:
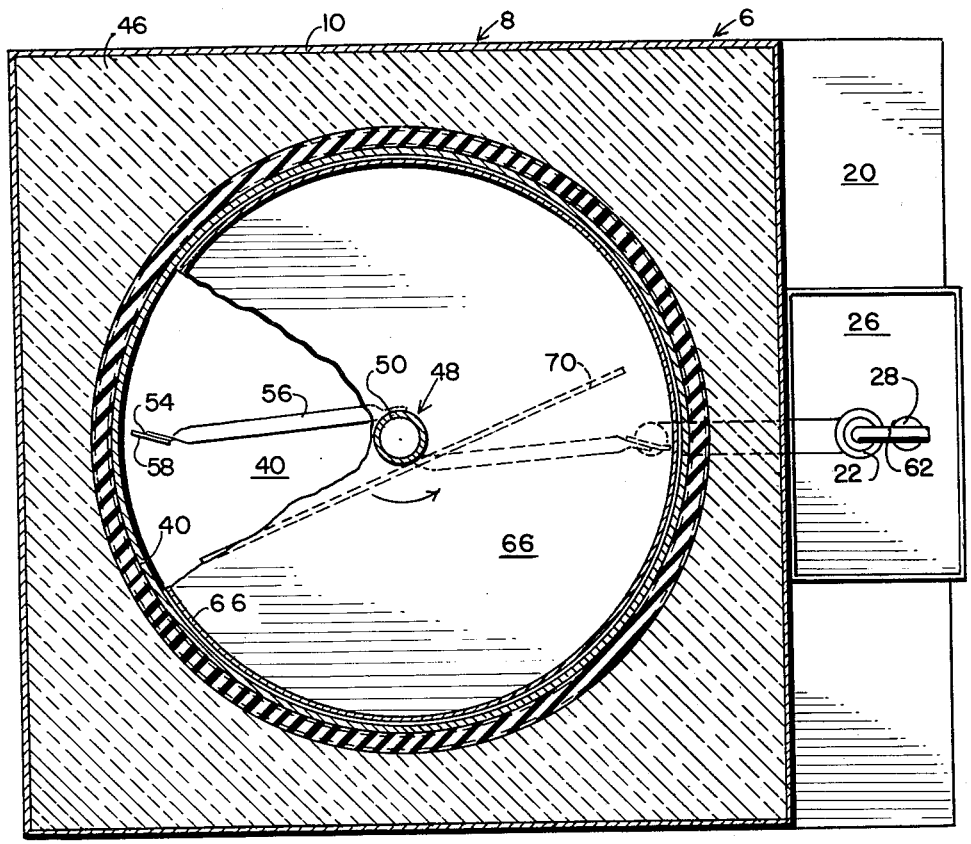
FIG. 3 is a view taken on line 3—3 of FIG. 2.

Referring now to the drawings FIGS. 1 through 3, the machine 6 for making and dispensing a slushy, fruit flavored, food drink shown is a preferred specific embodiment of the new means of my invention. The machine 6 has an outer housing 8 which can be made of any suitable material in any suitable manner. I have found it convenient and preferable to make the housing out of metal sheet such as stainless steel, polished aluminum, or enameled metals. The housing 8 preferably has an upper portion 10 which houses the means proper for making the slushy food drink, and a lower portion 12 which houses mechanical refrigeration equipment 14, such conveniently being of common and known design and operation. Lower portion 12 of housing 8 preferably has a door 16 suitably hingedly mounted and operable by common latch means having an operating handle 18. The upper portion 10 and lower portion 12 of housing 8 at its juncture is preferably designed and construced to form a ledge 20. This ledge 20 provides for the support of means to hold paper cups, and the like, into which the slushy food drink from the machine is passed through spigot 22. This support means has two side members 24 which are suitably mounted and attached to the front of the upper portion 10 of housing 8 and to ledge 20. These side members 24 mount and support drip pan 26 having drain 28 therein. The ledge 20 in turn preferably has a usual drain (not shown) to pass off drippings from pan 26, and to pass off washings from the slush making machine, etc., through drain line 30 having valve means 32 therein. The upper portion 10 of housing 8 also preferably mounts on and off switch means 34 for controlling refrigeration system 14 and stirrer or paddle means described hereinafter. Control and/or indicating mechanism 36 for regulating the temperature of the slush food drink can also conveniently be mounted in upper portion 10 of housing 8. The slush making machine proper is mounted on the lower portion 12 of housing 8 on the top 38 thereof. It has an elongated, vertically disposed, cylindrical tank 40 which is preferably made of metal such as stainless steel. This tank 40 is preferably insulated throughout its length and on the bottom between the tank 40 and the housing 8. Refrigeration coils 41 are wrapped around tank 40 in close heat exchange relation thereto, preferably in direct contact with the outside surface of tank 40. These coils 42 are the cooling coils for the compressor means 14 of the refrigeration system, or they can circulate a cooling medium chilled by refrigeration system 14. They can be of any common and suitable design and operated in the usual manner. I prefer that these coils 42 be embedded in an insulating material 44 which can conveniently be of a rubber-like nature, asphalt tar, etc. This has been found to be a desirable construction to position and maintain coils 42 in heat exchange relation to tank 40, and to properly insulate the coils and tank immediately adjacent thereto. Additional insulation material 46 is placed between upper housing 10 and this insulation layer 44. So-called Rubbertex insulation has been found satisfactory, other materials also being suitable, such as foamed plastic materials, rigidly supported fiber glass mat, etc.

Dasher means 48 are preferably removably mounted in tank 40. They consist of an elongated hollow center operating shaft 50 preferably made of stainless steel, such shaft 50 being coaxial with the longitudinal axis of tank 40 and adapted to rotate within the tank. Operating shaft 50 is preferably made hollow (as shown), and mounted on bearing means 52 suitably positioned centrally on the bottom of tank 40, the shaft 50 fitting over the upper portion of bearing 52. Paddles 54 are preferably oppositely mounted on shaft 50 and parallel thereto, being attached to and spaced from shaft 50 by arm numbers 56 suitably mounted and attached to the paddles and shaft 50. These paddles 54 preferably have an outer sharpened edge 58 which in operation pass in relatively close scraping relation to the inner walls of tank 40 in the lower freezing portion thereof to prevent a substantial build-up of ice on the inner walls of tank 40 during production of the slush food drink and maintaining same in the lower portion of tank 40 for dispensing. I have found in operation that it is desirable that the outer edges of paddles 54 be spaced approximately $\frac{1}{16}$ to $\frac{1}{8}$ inch from the walls of tank 40. In operation, with dasher means 48 rotating relatively slowly in tank 40, the fruit flavored slushy food drink preferably prepared by the machine of my invention is made in this lower freezing portion of tank 40 having the dasher means 48 therein. When produced it is withdrawn from tank 40 preferably from the upper portion of the lower freezing portion through conduit 60 and spigot 22. The spigot 22 is preferably an open cock type valve having operating handle 62. Tank 40 is preferably provided with a drain line 30 through which the tank can be drained, when such is desired. I have found that this drain conduit 30 can be used, if desired, to aid in partially carbonating the slushy food drink produced in thee machine, by providing a conduit 64 in drain line 30 to introduce carbon dioxide into the slush in tank 40.

A removable storage or feed material tank 66 is provided and used in the upper storage portion of tank 40. Like tank 40, tank 66 is preferably open in its upper end and has a centrally located hole in its bottom to receive shaft 50. As shown in FIG. 2 of the drawings, close clearance is maintained between shaft 50 and tank 66 when mounted thereon. Tank 66 is suitably positioned in tank 40 as shown in FIG. 2, crimping the walls of tank 40 at point 68 to provide a ledge having been found convenient and desirable construction. A baffle 70 is preferably mounted at an angle as shown in FIGS. 2 and 3 on the bottom of storage or feed material tank 66, such baffle 70 projecting downwardly into the freezing portion of the machine which is the lower portion of tank 40. With the dasher means rotating counter-clockwise as indicated by the arrows on FIGS. 2 and 3, this baffle 70 is positioned as shown and results in guiding and directing slush toward slush outlet 60 from the upper portion of the freezing portion of tank 40. With such construction no build-up of slush and improper operating of the machine has been encountered.

Hollow shaft 50 has a plurality of spaced holes 72 in the lower end portion thereof in the bottom of tank 40, and a plurality of other spaced holes 74 herein just above the bottom of the storage or feed material tank 66. This provides fluid communication between tank 66 and the lower portion of tank 40. As a result, when material is withdrawn from the freezing portion of tank 40 through conduit 60 and spigot 22, feed material will pass through holes 74 from tank 66, the hollow of shaft 50 and out through holes 72 into the lower freezing portion, seeking the path of least resistance and under the drive of the hydrostatic fluid head due to the material in tank 66. Also, the hydrostatic head of fluid provided allows the withdrawal of slushy fruit flavored drink through conduit 60 and spigot 22.

The top of the housing 8 is preferably a lid or cap 78 having a hingedly mounted portion 80 which can conveniently be raised by a handle portion 82 suitably mounted thereon. Fruit flavored and sweetened feed material is then poured into tank 66 through the opening provided by raising hinged portion 80 to replace feed material withdrawn therefrom as a result of dispensing slushy food drink through conduit 60 and spigot 22. These lid or cap means 78 preferably mount a common electric motor (not shown) housed in housing 84 properly positioned on lid or cap means 78. Supports 86 attached to lid 78 in any convenient manner have been found ideal on which to mount the motor in question. A shaft 88 is rotated by the motor using any gearing (not shown) of common and known design, if desired, shaft 88 in operation preferably turning relatively slowly to in turn rotate dasher means 48 relatively slowly. A notch in the lower end of shaft 88 fitting over a bar 90 mounted in the upper end of hollow shaft 50 has been found to suitably removably mount a motor operating means. Mounting pins 92 on motor supports 86 have been found suitable and desirable to removably mount and position the motor means (not shown). Motor housing 84 can conveniently fit over the motor means and rest on the top of the lid or cap 78. The particular easily disassembled machine means depicted in the drawings and described hereinbefore has been found to be very efficient and particularly desirable from an operating standpoint as well as a construction stand-point. With this structure it is very easy to dismantle the various operating parts of the slush making machine so that they can be cleaned and sterilized readily.

In operation of the apparatus, the fruit flavored and sweetened water to be partially frozen to provide a slush condition is introduced into tank 40 preferably up to approximately the level of the bottom of feed or storage tank 66. The dasher means 48 are inserted, and the feed tank 66 thereover. Then tank 66 can be filled with material to be used subsequently. The upper rotating means and assembly for dasher means 48 is then mounted, and with such the apparatus is ready for operation. Freezing is commenced by operation of refrigerating means 14, with paddle means 48 rotating relatively slowly. The freezing point of the fruit flavored and sweetened food drink will vary slightly according to the concentration of flavoring and sugar, and with minor experience in testing, the most desired refrigeration conditions for the right slush condition can be easily found out. A temperature indicator 36 can be used to note reaching the freezing point upon commencing operation. With very little use, I have found that the operator can closely estimate the time to produce the desired slushy material, and of course, it is easy to sample the slushy food drink through spigot 22. If desired, the refrigeration system can be time controlled in accordance with dispensing demand. As the slush produced is dispensed through spigot 22, additional feed material can be poured into tank 66 through the opening provided by hinged lid 80. The new machine of my invention has been so successful that I have constructed one which will operate almost continuously in dispensing the slush food drink.

Figure 4:
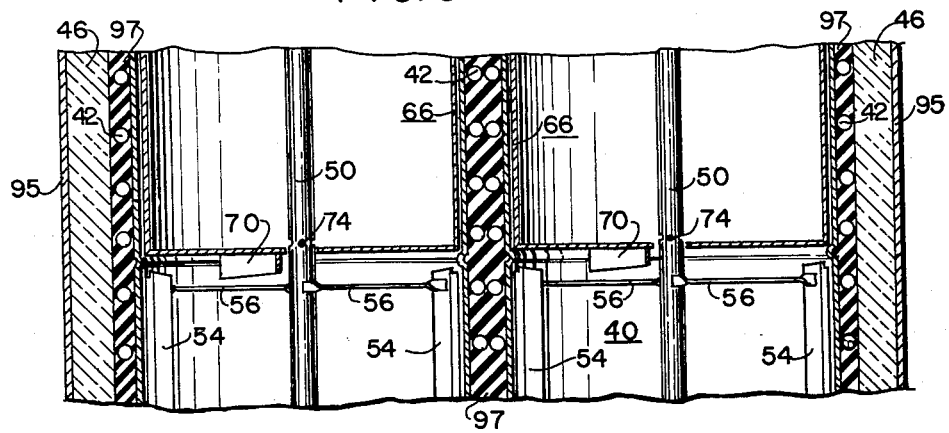
FIG. 4 is a partial longitudinal elevation in cross-section through another preferred specific embodiment of apparatus of my invention for making fruit flavored water into a slush food drink, such preferred specific embodiment having a plurality of tanks and co-operating assembly for making a plurality of different fruit flavored slushy food drinks.

In FIG. 4 is shown another preferred specific embodiment of the new machine of my invention for making a fruit flavored, sweetened food drink. In this specific embodiment two separate slush making units are incorporated into the same machine and housing 95. The internal slush making machine parts for each of the units is the same as in that single machine shown in FIGS. 1 through 3 in the drawings. The same numerals are used indicating the same parts or assemblies. Refrigeration coils 42 are wrapped around each of the tanks 40 of this twin unit, with tar or other suitable material 97 being used in the same or similar manner as that of material 44 in the embodiment of FIGS. 1 through 3. Insulation 46 between the housing 95 and tanks 40 is used just as in the single embodiment. The slush making operation and mechanism preferably functions in the manner of the single unit. However, it has been found desirable to use the twin or other units having multiple slush making equipment for making slush food drinks of somewhat the same sweetness requirements, that is, for example, orange and grape together in a twin unit like that of FIG. 4, or lime and lemon together in a twin unit. The citric acid and/or sugar concentration of lime and lemon flavored food drinks are comparable, and such a close situation exists between a grape flavored drink and an orange drink. The equipment using two or more separate slush making units has been found to operate much more satisfactorily if the freezing points of the drink mixtures are relatively close.

As will be evident to those skilled in the art, various modifications of this invention can be made, or followed, in the light of this disclosure and discussion, without departing from the spirit or scope of the disclosure or from the scope of the claims.

I claim:

1. Apparatus for making and dispensing a slushy, fruit flavored, food drink comprising, in combination, an elongated, vertically disposed, cylindrical, metal tank insulated on the outside thereof, said tank having a lower freezing portion and an upper feed storage portion, refrigeration means mounted in cooling relation to said tank on the outside thereof and operative to remove heat passing through the walls thereof, dasher means mountable in said tank and comprising, an elongated hollow center operating shaft removably mountable in said tank coaxial with the longitudinal axis thereof and substantially the full height of said tank, said shaft in the lower portion having a pair of opposite and parallel positioned paddles attached thereto and spaced therefrom to in operation turn with said shaft with the outer edges of said paddles in relatively close scraping relation to the walls of said tank in said lower freezing portion thereof, said outer edges of said paddles being sharpened, an upper separate cylindrical storage tank removably and concentrically mountable in said upper storage portion of said first-named tank with said shaft passing through a central hole in the bottom of said storage tank, means to position and maintain said storage tank above and out of contact with said paddles when in operating position, a spigot controlled slush outlet in the upper portion of said lower portion of said first-named tank below said bottom of said storage tank and a drain outlet in the lower portion of said lower portion of said first-named tank, a baffle mounted on the bottom of said storage tank and projecting downwardly therefrom, said baffle positioned to in operation direct slush moved by said paddles in the direction of said slush outlet, a plurality of spaced holes in said shaft in the lower portion of the portion in said lower portion of said first-named tank and another plurality of spaced holes in said shaft above said bottom of said storage tank providing fluid communication through said hollow operating shaft between said storage tank and said freezing portion of said first-named tank, lid means removably mountable to cover the open upper ends of said tanks, said lid means having a hinged portion to when raised allow introduction of feed material into said storage tank, and means mounted on said lid means removably connected to the upper end portion of said shaft to turn same in operation, and said apparatus constructed and operable to receive fruit flavored and sweetened water in said storage tank, pass same to said freezing portion of said first-named tank through said shaft and said holes therein, therein freeze a portion of said water to provide a slush condition and pass resulting slush out said slush outlet.

2. Apparatus for making and dispensing a slushy, fruit flavored, food drink comprising, in combination, a vertically disposed cylindrical tank having a lower freezing and an upper storage portion, refrigeration means mounted in cooling relation to said tank operative to remove heat passing through the walls thereof, dasher means mounted in said tank and comprising, an operating shaft hollow in its lower portion and removably mountable in said tank, paddles spaced from said shaft and attached thereto in the lower portion to in operation turn with said shaft in relative close scraping relation to the walls of said tank in said freezing portion thereof, a storage tank removably mountable in said upper storage portion of said first-named tank with said shaft passing through a hole in the bottom of said storage tank, a slush outlet in said freezing portion of said first-named tank and a drain outlet in the lower portion of said freezing portion of said first-named tank, baffle means mounted on the bottom of said storage tank and projecting downwardly therefrom, said baffle means constructed and positioned to in operation direct slush to said slush outlet, a hole in said hollow portion of said shaft above the bottom of said storage tank and a hole in the hollow portion of said shaft in said freezing portion of said first-named tank providing fluid communication between said storage tank and said freezing portion of said first-named tank, and means operatively and removably connected to said shaft to turn same in operation, and said apparatus constructed and operable to receive water in said storage tank, pass same to said freezing portion of said first-named tank through said hollow of said shaft and said holes therein, therein freeze a portion of said water to provide a slush condition and pass resulting slush out said slush outlet.

3. Apparatus for making and dispensing a slushy, fruit flavored, food drink comprising, in combination, a vertically disposable tank separatable into a lower freezing portion and an upper storage portion, means operatively mounted relative to said tank to remove heat passing through the walls thereof in both of said lower freezing and upper storage positions, an operating shaft hollow in a lower portion and removably mountable in said tank longitudinal thereto, paddle means mounted on said shaft in the lower portion thereof to operate in said freezing portion of said tank, removable partition means mountable in said tank to provide said lower freezing portion and said upper storage portion, a slush outlet in the upper portion of said freezing portion of said tank, a hole in said hollow portion of said shaft in said freezing portion of said tank, and said storage portion, said freezing portion and the hollow of said shaft being in fluid communication when said partition means is mounted in said tank, and means operatively connected and removably so to turn said shaft in operation, and said apparatus constructed and operable to receive water in said storage portion of said tank, pass same to said freezing portion of said tank through said shaft, therein freeze a portion of said water to make slush and pass resulting slush out said slush outlet.

4. Apparatus for freezing fruit flavored water to provide a slushy material comprising, in combination, a tank having a freezing portion separatable from a feed material portion, means constructed and mountable within said tank to so separate said tank, means mounted and operable to remove heat passing through the walls of said tank from said freezing portion of said tank to partially freeze said water therein and from said feed material portion to refrigerate feed material therein, paddle means mountable in said freezing portion of said tank to turn therein in operation, a slush outlet in the upper portion of said freezing portion of said tank, unrestricted conduit means constructed and adapted to pass water from said feed material portion of said tank to said freezing portion of said tank, and means operable to turn said paddle means in operation, said conduit means in operation operatively connecting said paddle means and said means to turn same, and said apparatus constructed and operable to receive water in said feed material portion of said tank, pass same to said freezing portion of said tank through said conduit means, therein freeze a portion of said water to produce a slush condition and pass resulting slush out said slush outlet.

5. Apparatus for partially freezing fruit flavored water to a slushy condition, comprising, in combination, a tank having a feed material portion and a freezing portion, means mountable and operable to remove heat passed through the walls of said tank in both of said feed material and freezing portions, paddle means mounted to turn in operation in said tank, means to turn said paddle means in operation, a slush outlet in said tank, and means constructed and adapted to feed water to said freezing portion of said tank from said feed material portion, said last-named means in operation operatively connecting said paddle means and said means to turn said paddle means, and said apparatus constructed and operable to pass water from said means last-named to said freezing portion of said tank, therein freeze a portion of said water to a slush condition and pass resulting slush out said slush outlet.

6. Apparatus for partially freezing fruit flavored water to a slushy condition, comprising, in combination, a tank, removable partition means dividing said tank into a feed material portion and a freezing portion thereunder, means mountable and operable to remove heat passed through the walls of said tank in said freezing portion, paddle means mounted in said freezing portion to turn in operation in said tank, means extending through the partition means adapted to turn said paddle means in operation, a slush outlet in said tank, means located substantially centrally with respect to said partition means and associated with said turning means to feed water to said freezing portion of said tank from said feed material portion, and said apparatus constructed and operable to freeze a portion of said water to a slush condition and pass resulting slush out said slush outlet.

References Cited in the file of this patent
UNITED STATES PATENTS

| | | |
|---|---|---|
| 2,282,662 | Lindsey | May 12, 1942 |
| 2,358,756 | Zoller | Sept. 19, 1944 |
| 2,515,722 | Maranz | July 18, 1950 |
| 2,648,274 | Bendfelt | Aug. 11, 1953 |
| 2,665,559 | Dexter | Jan. 12, 1954 |
| 2,737,024 | Swenson | Mar. 6, 1956 |
| 2,779,167 | Lo Faro | Jan. 29, 1957 |
| 2,788,643 | Martin | Apr. 16, 1957 |